US012790849B1

(12) United States Patent
Li

(10) Patent No.: US 12,790,849 B1
(45) Date of Patent: Nov. 10, 2026

(54) SWIMMING POOL ROBOT

(71) Applicant: Nanjing Dituxin Technology Co., Ltd., Nanjing (CN)

(72) Inventor: Tingjin Li, Nanjing (CN)

(73) Assignee: Nanjing Dituxin Technology Co., Ltd., Nanjing (CN)

( * ) Notice: Subject to any disclaimer, the term of this patent is extended or adjusted under 35 U.S.C. 154(b) by 0 days.

(21) Appl. No.: 19/573,805

(22) Filed: Mar. 20, 2026

(30) Foreign Application Priority Data

Feb. 12, 2026 (DE) ......................... 202026100789.7

(51) Int. Cl.
*E04H 4/16* (2006.01)
*C02F 1/00* (2023.01)
*C02F 103/42* (2006.01)
*E04H 4/12* (2006.01)

(52) U.S. Cl.
CPC ........... *E04H 4/1654* (2013.01); *C02F 1/001* (2013.01); *C02F 1/008* (2013.01); *E04H 4/1263* (2013.01); *C02F 2103/42* (2013.01)

(58) Field of Classification Search
None
See application file for complete search history.

(56) References Cited

U.S. PATENT DOCUMENTS 12,416,173 B1 * 9/2025 Durin .................... E04H 4/1654
2011/0203060 A1 * 8/2011 Pichon .................. E04H 4/1654 15/1.7

FOREIGN PATENT DOCUMENTS

CN 118815253 A * 10/2024 ........... E04H 4/1663

* cited by examiner

*Primary Examiner* — Krishnan S Menon
(74) *Attorney, Agent, or Firm* — MUNCY, GEISSLER, OLDS & LOWE, P.C.

(57) ABSTRACT

A swimming pool robot comprising: a body, wherein an cavity for placing parts is provided in the body, and the body is further provided with a first water inlet, a second water inlet, a first water outlet and a second water outlet respectively communicated with the cavity; a container, wherein at least one opening is provided on the container; a filter detachably mounted in the container; and a water flow driving device, provided in the cavity. The water flow driving device is at least partially sleeved in a channel of a first guiding part, the first guiding part is rotatably connected and communicated with a second guiding part, and an opening is provided at an end of the second guiding part. The robot can automatically switch among various cleaning modes such as pool bottom, pool wall and water surface.

10 Claims, 5 Drawing Sheets

SWIMMING POOL ROBOT

TECHNICAL FIELD

The present invention relates to the technical field of swimming pool cleaning equipment, in particular to a swimming pool robot.

BACKGROUND ART

Most swimming pool robots on the current market adopt a single cleaning mode, which can usually only perform water surface cleaning, underwater cleaning or side wall cleaning separately, and can't freely switch among water surface cleaning, underwater cleaning and side wall cleaning. This makes swimming pool robots unfriendly to consumers and inefficient in pool cleaning. Although some robots have multi-mode functions, they often feature complex structures, requiring manual intervention or part disassembly and replacement during mode switching, which is inconvenient to operate and has low cleaning efficiency.

Therefore, the present invention provides a swimming pool robot to solve the problems mentioned above.

SUMMARY OF THE INVENTION

The object of the present invention is to provide a swimming pool robot for solving the problems raised in the above background art.

To achieve the above object, the present invention provides the following technical solution: a swimming pool robot, comprising: a body, wherein an cavity for placing parts is provided in the body, and the body is further provided with a first water inlet, a second water inlet, a first water outlet and a second water, and the first water inlet, the second water inlet, the first water outlet and the second water outlet are in communication with the cavity respectively; a container, wherein at least one opening is provided on the container; a filter detachably disposed in the container; and a water flow driving device, wherein the water flow driving device in communication with the filter via the at least one opening, the water flow driving device is at least partially sleeved in a channel of a first guiding part, the first guiding part is rotatably connected to and in communication with a second guiding part, and an opening is provided at an end of the second guiding part; when the swimming pool robot is in a first operation mode, the second guiding part faces the first water outlet, and the first water inlet, the filter, the water flow driving device and the first water outlet form a first water flow path; when the swimming pool robot is in a second operation mode, the second guiding part rotates to face the second water outlet, and the second water inlet, the filter, the water flow driving device and the second water outlet form a second water flow path.

Optionally, the first water inlet, the second water inlet, the first water outlet and the second water outlet are respectively located on different surfaces of the body.

Optionally, the first water inlet and the first water outlet are respectively located at the bottom and a top of the body, and the second water inlet and the second water outlet are respectively located at a front portion and a rear portion of the body.

Optionally, boxa box is further provided in the body, box and the water flow driving device comprises: an impeller exposed outside the box and sleeved in the channel of the first guiding part; and a motor, wherein the motor is connected with the impeller and at least partially sealed in the box.

Optionally, a control device is provided in the box, and the control device is electrically connected with the second guiding part.

Optionally, the first guiding part is provided with a first sensor, the second guiding part is provided with a second sensor, a signal is transmitted between the first sensor and the second sensor, and the control device determines a position of the opening of the second guiding part relative to a position of the first guiding part based on sensing information from the first sensor and/or the second sensor.

Optionally, the first operation mode comprises the swimming pool robot performing a cleaning operation on a side wall of the swimming pool or performing a cleaning operation on a bottom of the swimming pool.

Optionally, the second operation mode comprises the swimming pool robot moving on a water surface to perform a water surface cleaning operation.

Optionally, the water flow driving device comprises two water pumps, and the first water outlet, the second water outlet, the swimming pool robot comprises two sets of the first guiding part and the second guiding part; when the swimming pool robot is in the first operation mode, each of the second guiding parts faces the nearest first water outlet; when the swimming pool robot is in the second operation mode, each of the second guiding parts rotates to face the nearest second water outlet.

Optionally, the second guiding part is provided with a first transmission member, and the swimming pool robot further comprises: a second transmission member and a driving device, wherein the second transmission member is provided in the cavity; the driving device is connected with the second transmission member, and the driving device is configured to drive the second transmission member to drive the first transmission member to rotate, thereby causing the second guiding part to rotate.

Figure 1:
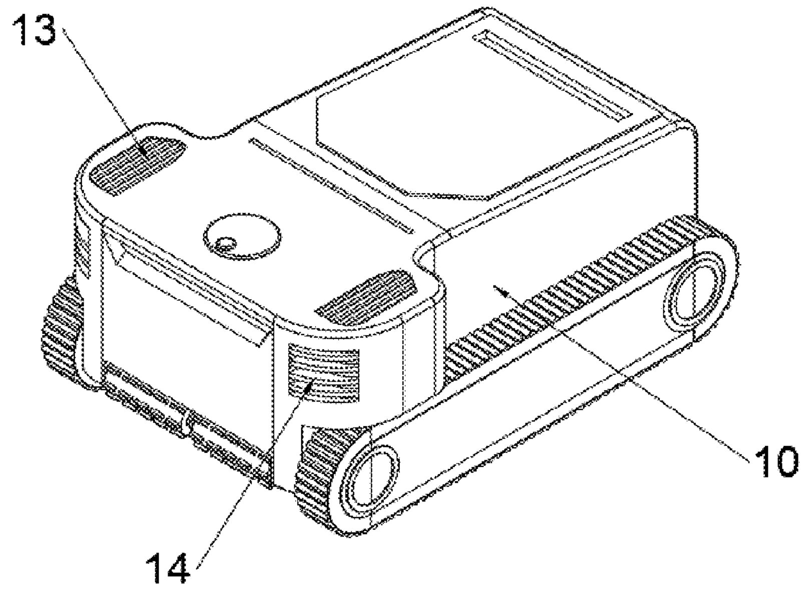
FIG. 1 is a schematic structural view of the present invention.

In the figures: 10, body; 11, first water inlet; 12, second water inlet; 13, first water outlet; 14, second water outlet; 17, filter; 18, container; 181, opening; 20, water flow driving device; 21, first guiding part; 22, second guiding part; 24, box; 25, impeller; 26, motor; 27, control device; 28, first transmission member; 29, second transmission member; 210, driving device; 211, first sensor; 212, second sensor.

DETAILED DESCRIPTION OF THE EMBODIMENTS

The technical solutions in the embodiments of the present utility model will be clearly and completely described below with reference to the accompanying drawings in the embodiments of the present utility model. Obviously, the described embodiments are only part of the embodiments of the present utility model, not all of them. Based on the embodiments of the present utility model, all other embodiments obtained by those skilled in the art without creative efforts shall fall within the protection scope of the present utility model.

In the description of the present invention, it should be understood that the terms indicating orientation or positional relationship, such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", are based on the orientation or positional relationship shown in the accompanying drawings, which are only for the convenience of describing the present invention and simplifying the description, rather than indicating or implying that the referred device or element must have a specific orientation, be constructed and operated in a specific orientation. Since the embodiments of the present invention disclosed herein can be provided in different directions, these directional terms are for illustration only and should not be regarded as limitations. For example, "upper" and "lower" are not necessarily limited to directions opposite to or consistent with the direction of gravity. In addition, features defined with "first" and "second" may explicitly or implicitly include one or more such features. In the description of the present invention, it should be noted that the terms "installation", "connection" and "connected" should be understood in a broad sense unless otherwise clearly specified and limited. For example, the connection may be fixed connection, detachable connection, or integral connection; it may be mechanical connection or electrical connection; it may be direct connection or indirect connection through an intermediate medium, and it may be internal communication between two elements. For those of ordinary skill in the art, the specific meaning of the above terms in the present invention can be understood according to specific circumstances.

It should also be noted herein that, in order to avoid obscuring the present invention with unnecessary details, only structures and/or processing steps closely related to the solutions of the present invention are shown in the accompanying drawings, and other details not greatly related to the present invention are omitted.

In addition, it should also be noted that the terms "include", "comprise" or any other variation thereof are intended to cover a non-exclusive inclusion, such that a process, method, article or device that includes a list of elements includes not only those elements but also other elements not explicitly listed, or elements inherent to such process, method, article or device.

Referring to FIGS. 1-7, the present invention provides a technical solution: a swimming pool robot includes: a body 10, a container 18, a filter 17 and a water flow driving device 20.

A cavity for accommodating various parts is provided in the body 10. A first water inlet 11, a second water inlet 12, a first water outlet 13 and a second water outlet 14 are respectively provided on the outer surface of the body 10, and these water inlets and water outlets are respectively communicated with the cavity.

Figure 2:
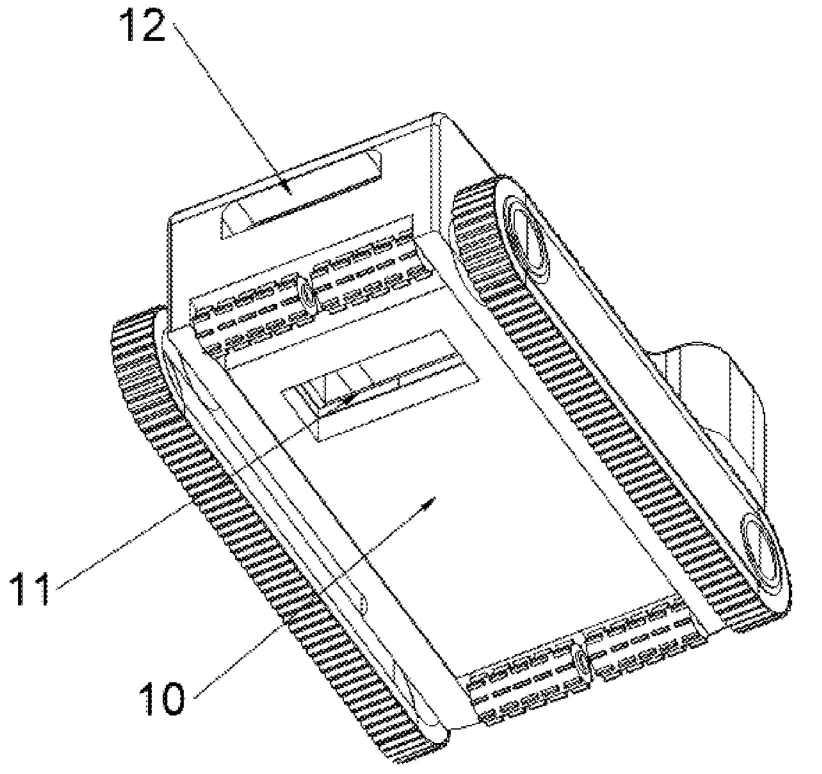
FIG. 2 is a side bottom view of the present invention.
Figure 3:
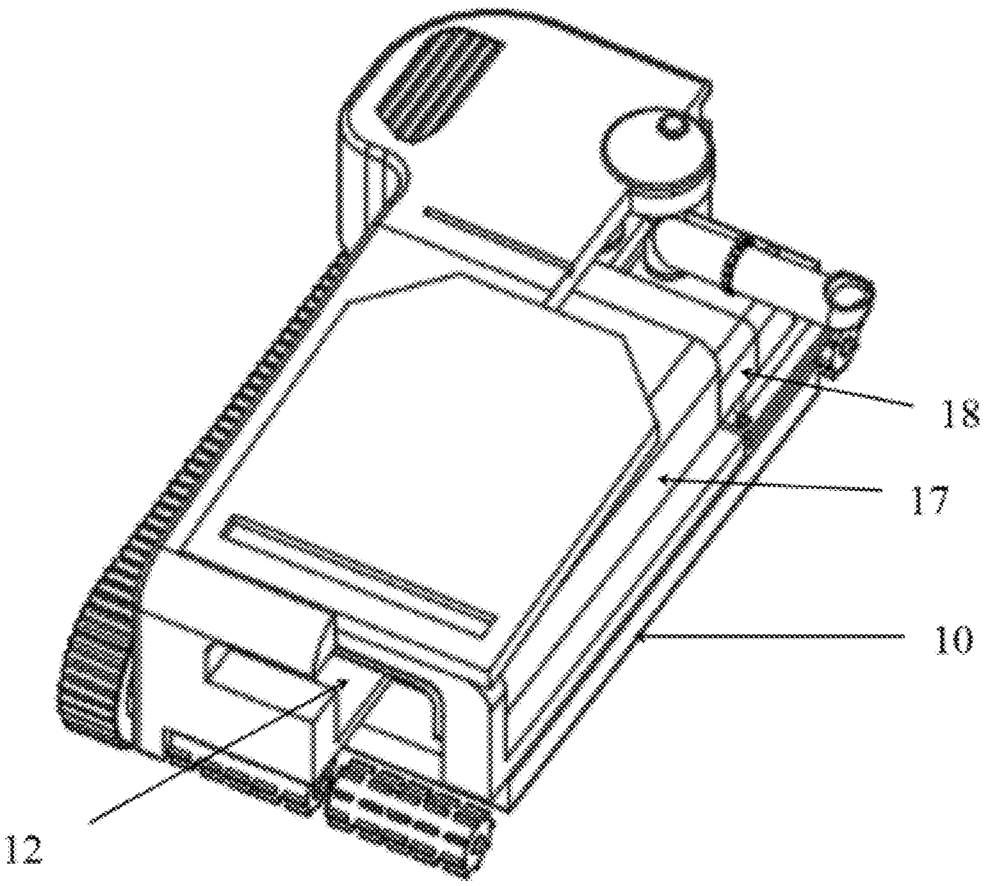
FIG. 3 is a cross-sectional view of a body shell in the present invention.
Figure 4:
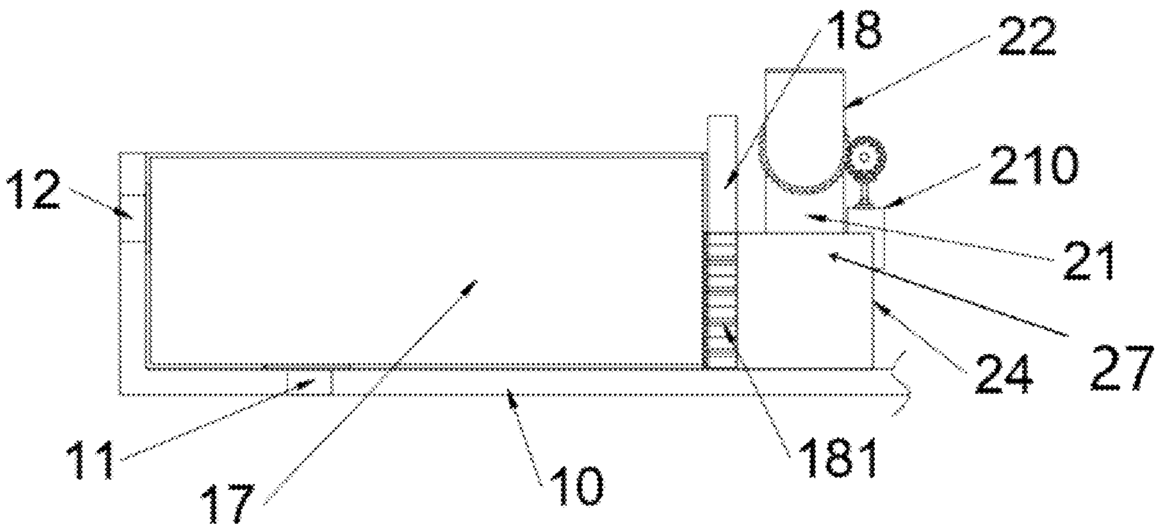
FIG. 4 is a side view of the body, the container and the water flow driving device in the present invention.
Figure 5:
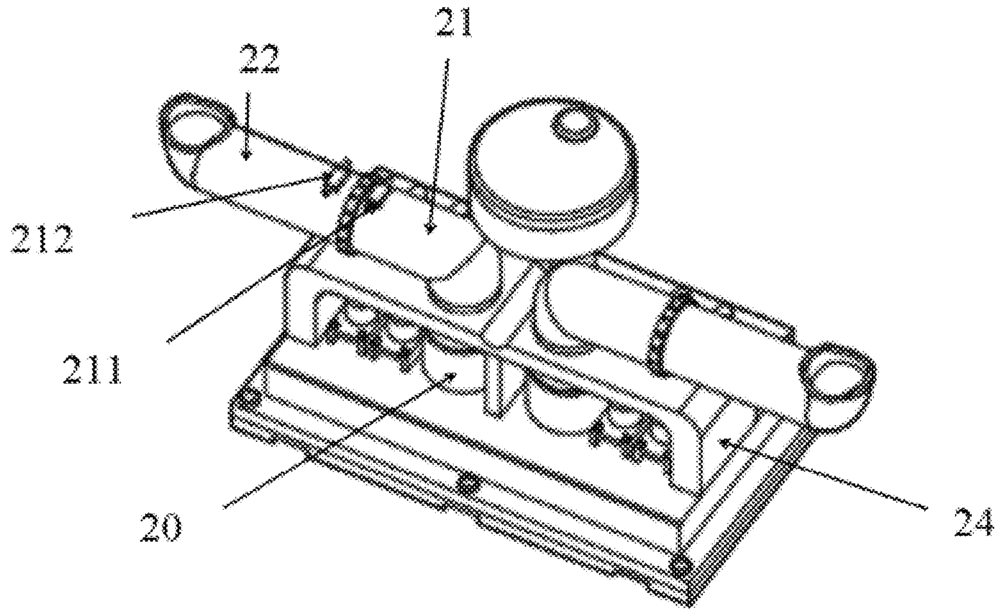
FIG. 5 is a schematic structural view of the water flow driving device in the present invention.
Figure 6:
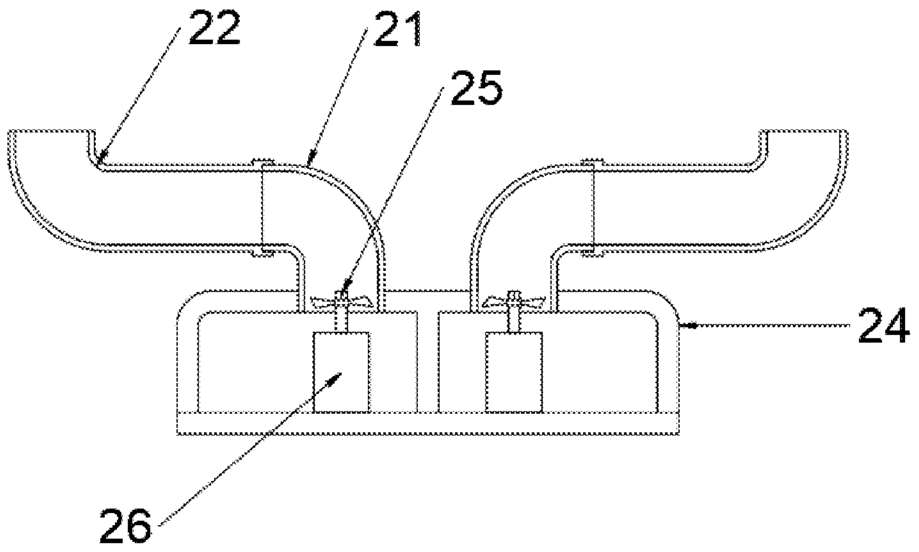
FIG. 6 is a side perspective view of the water flow driving device in the present invention.

As can be seen from FIGS. 1 and 2, the first water inlet 11 is located at the bottom of the body 10, and the first water outlet 13 is located at the top of the body 10; the second water inlet 12 is located at the front portion of the body 10, and the second water outlet 14 is located at the rear portion of the body 10.

The container 18 is mounted in the body 10, and a plurality of openings 181 are provided on its side surface for water flowing through. The filter 17 is detachably mounted in the container 18, and a handle may be provided on the filter 17 so that the user can take out the filter 17 for cleaning or replacing the filter screen. The water filtered by the filter 17 flows out from the openings 181. The filter 17 may be a dust box or a dust bag.

The water flow driving device 20 is communicated with the filter 17 through the openings 181 on the container 18. The water filtered by the filter 17 flows from the openings 181 to the water flow driving device 20, and then the water flow driving device 20 pumps the water out of the body 10. The water flow driving device 20 may be a water pump.

A first guiding part 21 is provided above the water flow driving device 20, wherein the first guiding part 21 is a fixed part with a channel inside, and at least part of the structure of the water flow driving device 20 (such as the impeller 25) is built in the channel; the first guiding part 21 is of an L-shaped structure, and one end of the first guiding part 21 is movably connected with the second guiding part 22.

In one embodiment, the second guiding part 22 is connected with the first guiding part 21 through a rotating structure, and the second guiding part 22 is in communication with the first guiding part 21 internally. An opening is provided at the end of the second guiding part 22 for discharging water flow. The water pumped out by the water flow driving device 20 passes through the first guiding part 21 and the second guiding part 22 respectively, and flows out of the body 10.

A box 24 is provided in the body 10, and the water flow driving device 20 comprises an impeller 25 and a motor 26. The impeller 25 is exposed outside the box 24 and is sleeved in the channel of the first guiding part 21. The motor 26 is connected with the impeller 25 through an output shaft, and the motor 26 is at least partially sealed in the box 24 for waterproof and moisture-proof purposes.

A control device 27 is installed in the box 24, and the control device 27 is communicatively connected with the second guiding part 22. The control device 27 can control the second guiding part 22 to rotate relative to the first guiding part 21 according to the operation mode of the robot.

For precise control, the first guiding part 21 is provided with a first sensor 211, and the second guiding part 22 is provided with a second sensor 212, the two sensors are in sensing connection with each other for signal transmission. The control device 27 determines the opening direction according to the position of the second guiding part 22 relative to a position of the first guiding part (21) in real time by receiving signals from the first sensor 211 and/or the second sensor 212, and ensure that the water flow is guided correctly.

The specific operation modes of the swimming pool cleaning robot are as follows:

First Operation Mode (Pool Bottom/Pool Wall Cleaning Mode):

In this mode, the control device 27 drives the second guiding part 22 to rotate so that its opening faces the first water outlet 13. At this moment, the water flow enters the body 10 from the first water inlet 11, and the water flow is filtered by the filter 17, and is sucked and pressurized by the water flow driving device 20, then ejected from the first water outlet 13 via the first guiding part 21 and the second guiding part 22, forming a downward thrust to make the robot attach to the pool bottom or pool wall to move and perform cleaning operations.

Second Operation Mode (Water Surface Cleaning Mode):

When the robot switches to the water surface cleaning mode, the control device 27 controls the second guiding part 22 to rotate so that its opening faces the second water outlet 14. At this moment, the water flow enters the body 10 from the second water inlet 12, filtered by the filter 17, pushed by the water flow driving device 20, and is finally ejected backward from the second water outlet 14, providing forward propulsion to make the robot move on the water surface and clean water surface floating objects.

When the robot is in the first operation mode and the opening of the second guiding part 22 faces the second water outlet 14, the control device 27 controls the second guiding part 22 to rotate so that the opening of the second guiding part 22 faces the first water outlet 13. When the robot switches from the first operation mode to the second operation mode, or when the robot is in the second operation mode and the opening of the second guiding part 22 faces the first water outlet 13, the second guiding part 22 is rotated 90 degrees so that the opening of the second guiding part 22 faces the second water outlet 14.

The first water inlet 11 is located at the bottom of the body 10, and the first water outlet 13 is located at the top of the body 10, which is suitable for water circulation during pool bottom and pool wall cleaning.

The second water inlet 12 is located at the front portion of the body 10, and the second water outlet 14 is located at the rear portion of the body 10, which is suitable for water propulsion during water surface traveling.

In another embodiment, the water flow driving device 20 may comprise two independent water pumps, and accordingly, the swimming pool robot comprises two sets of the first water outlet 13, the second water outlet 14, the first guiding part 21 and the second guiding part 22.

In this configuration, each second guiding part 22 can be independently controlled, further improving the flexibility of water flow control and cleaning efficiency.

Figure 7:
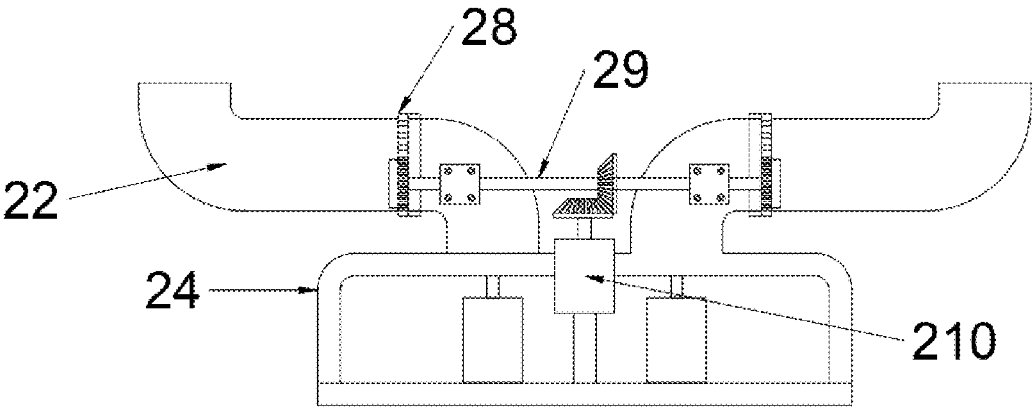
FIG. 7 is a schematic structural view of the first transmission member, the second transmission member and the driving device in the present invention.

As shown in FIG. 7, the second guiding part 22 is provided with a first transmission member 28. A second transmission member 29 and a driving device 210 are also provided in the body 10. The driving device 210 is connected with the second transmission member 29, and drives the first transmission member 28 to rotate through the second transmission member 29 to enable positioning rotation of the second guiding part 22. A gear transmission, a belt transmission, a connecting rod transmission, or the like may be arranged between the driving device 210 and the second transmission member 29, and between the second transmission member 29 and the first transmission member 28.

Working principle: When the robot is started, the control device 27 drives the second guiding part 22 to rotate to a corresponding position according to the selected mode. The water flow enters the body from the corresponding water inlet, filtered by the filter 17, accelerated by the water flow driving device 20 to be ejected from the corresponding water outlet, thereby generating propulsion force or adsorption force.

The contents not described in detail in this specification is prior art known to those skilled in the art.

Although the embodiments of the present invention have been shown and described, it should be understood by those skilled in the art that various changes, modifications, replacements and variations can be made to these embodiments without departing from the principle and spirit of the present invention, and the scope of the present invention is defined by the appended claims and their equivalents.

The invention claimed is:

1. A swimming pool robot, comprising:

a body, wherein a cavity is provided in the body, the body is further provided with a first water inlet, a second water inlet, a first water outlet and a second water outlet, and the first water inlet, the second water inlet, the first water outlet and the second water outlet are in communication with the cavity respectively;

a container, wherein at least one opening is provided on the container;

a filter detachably disposed in the container;

a water flow driving device in communication with the filter via the at least one opening, the water flow driving device is at least partially sleeved in a channel of a first guiding part, the first guiding part is rotatably connected to and in communication with a second guiding part, and an opening is provided at an end of the second guiding part;

when the swimming pool robot is in a first operation mode, the second guiding part faces the first water outlet, and the first water inlet, the filter, the water flow driving device and the first water outlet form a first water flow path;

when the swimming pool robot is in a second operation mode, the second guiding part face the second water outlet, and the second water inlet, the filter, the water flow driving device and the second water outlet form a second water flow path.

2. The swimming pool robot according to claim 1, wherein the first water inlet and the second water inlet are located on a first side surface of the body, the first water outlet and the second water outlet are located on a second side surface of the body, wherein the first side surface is different from the second side surface.

3. The swimming pool robot according to claim 2, wherein the first water inlet and the first water outlet are located at a bottom and a top of the body respectively, and the second water inlet and the second water outlet are located at a front portion and a rear portion of the body respectively.

4. The swimming pool robot according to claim 1, wherein a box is further provided in the body, and the water flow driving device comprises:

an impeller exposed outside the box and the impeller is sleeved in the channel of the first guiding part;

a motor connected with the impeller, and the motor is at least partially sealed in the box.

5. The swimming pool robot according to claim 1, wherein a control device is provided in the box.

6. The swimming pool robot according to claim 5, wherein the first guiding part or the second guiding part is provided with a sensor which is enable to sense a orientation of the opening of the second guiding part relative to the first guiding part.

7. The swimming pool robot according to claim 1, wherein the first operation mode comprises the swimming pool robot performing a cleaning operation on a side wall of the swimming pool or performing a cleaning operation on a bottom of the swimming pool.

8. The swimming pool robot according to claim 1, wherein the second operation mode comprises the swimming pool robot moving on a water surface to perform a water surface cleaning operation.

9. The swimming pool robot according to claim 1, wherein the water flow driving device comprises two water pumps, and the swimming pool robot comprises two sets of the first water outlet, the second water outlet, the first guiding part and the second guiding part;

when the swimming pool robot is in the first operation mode, each of the second guiding parts faces the nearest first water outlet; when the swimming pool robot is in the second operation mode, each of the second guiding parts rotates to face its nearest second water outlet.

10. The swimming pool robot according to claim 1, wherein the second guiding part is provided with a first transmission member, and the swimming pool robot further comprises:

a second transmission member provided in the cavity;

a driving device connected with the second transmission member, wherein the driving device is configured to drive the second transmission member to drive the first transmission member to rotate, thereby causing the second guiding part to rotate.

* * * * *